(12) United States Patent
Kim et al.

(10) Patent No.: US 10,298,135 B1
(45) Date of Patent: May 21, 2019

(54) DEVICE AND METHOD FOR CONTROLLING POWER SUPPLY

(71) Applicants: Sanken Electric Co., Ltd., Saitama (JP); Sanken Electric Korea Co., Ltd., Seoul (KR)

(72) Inventors: Mi Yong Kim, Seoul (KR); Masaaki Shimada, Seoul (KR); Eun Suk Lee, Seoul (KR); Tetsuya Tabata, Saitama (JP); Hiroaki Nakamura, Saitama (JP)

(73) Assignees: Sanken Electric Co., Ltd., Saitama (JP); Sanken Electric Korea Co., Ltd., Seoul (KR)

( * ) Notice: Subject to any disclaimer, the term of this patent is extended or adjusted under 35 U.S.C. 154(b) by 0 days.

(21) Appl. No.: 15/928,144

(22) Filed: Mar. 22, 2018

(51) Int. Cl.
*H02M 3/157* (2006.01)
*H02M 3/335* (2006.01)
*H02H 3/16* (2006.01)

(52) U.S. Cl.
CPC ........ *H02M 3/33507* (2013.01); *H02H 3/162* (2013.01)

(58) Field of Classification Search
CPC ............. H02M 3/335; H02M 3/33507; H02M 3/33515; H02M 3/156; H02M 3/157
See application file for complete search history.

(56) References Cited

U.S. PATENT DOCUMENTS 5,914,865 A * 6/1999 Barbehenn .............. H02M 1/40
323/902

* cited by examiner

*Primary Examiner* — Gary L Laxton
(74) *Attorney, Agent, or Firm* — Harness, Dickey & Pierce, P.L.C.

(57) ABSTRACT

A device and method for controlling a power supply. The method includes: monitoring a feedback signal of a feedback terminal; determining whether the feedback signal of the feedback terminal is not a pulse signal; and terminating an on/off operation of a switching element when the feedback signal of the feedback terminal is not a pulse signal. Therefore, an abnormal status of the device can be correctly detected with a simple structure when the feedback terminal is open or is shorted with other terminals, while an error operation and a damage of the device can be avoided.

15 Claims, 7 Drawing Sheets

DEVICE AND METHOD FOR CONTROLLING POWER SUPPLY

TECHNICAL FIELD

Embodiments of the present disclosure generally relate to the field of power supply, and more particularly, to a device and method for controlling a power supply.

BACKGROUND

A power supply that is often used in telecommunications, transportation, industry and other applications may require electrical isolation between an input and an output of the power supply. A transformer with a primary winding and a secondary winding is often used to provide this isolation. Furthermore, the power supply may further include a switching element and a rectifying diode connected to the secondary winding.

FIG. 1 is a diagram which shows a schematic illustration of a power supply and a device for controlling the power supply in the prior art. As shown in FIG. 1, a power supply 100 is used to convert a first voltage (Vin, such as a direct current voltage or direct voltage) into a second voltage (Vo, such as a direct current voltage or direct voltage). The power supply 100 may include a switching element 101, a transformer 102 with a primary winding 1021 and a secondary winding 1022, a rectifying diode 103 connected to the secondary winding 1022.

As shown in FIG. 1, a device 110 for controlling the power supply 100 may include a source voltage terminal 111 (for example it is referred to as VCC), a feedback terminal 112 (for example it is referred to as FB), and a driving terminal 113 (for example it is referred to as DRV) for driving the switching element 101. An on/off operation of the switching element 101 may be controlled by a driving signal from the driving terminal 113 with a pulse width modulation (PWM).

As shown in FIG. 1, the feedback terminal 112 may connect to a drain electrode of the switching element 101 and may be configured to be inputted a feedback signal from the drain electrode of the switching element 101. Furthermore, the feedback terminal 112 may connect to an auxiliary winding in a side of the primary winding, this may be referred to as a structure of primary side regulation (PSR); or the feedback terminal 112 may connect to an optical coupler in a side of the secondary winding, this may be referred to as a structure of secondary side regulation (SSR).

This section introduces aspects that may facilitate a better understanding of the disclosure. Accordingly, the statements of this section are to be read in this light and are not to be understood as admissions about what is in the prior art or what is not in the prior art.

SUMMARY

However, the inventor found that an abnormal status of the device needs to be detected when the feedback terminal is open (such as disconnected with the drain electrode of the switching element) or is shorted with other terminals (such as the source voltage terminal).

In order to solve at least part of the above problems, methods, apparatus, devices are provided in the present disclosure. Features and advantages of embodiments of the present disclosure will also be understood from the following description of specific embodiments when read in conjunction with the accompanying drawings, which illustrate, by way of example, the principles of embodiments of the present disclosure.

In general, embodiments of the present disclosure provide a device and method for controlling a power supply. It is expected to correctly detect an abnormal status of the device when the feedback terminal is open or is shorted with other terminals.

In a first aspect, a device for controlling a power supply is provided. The device includes a source voltage terminal, a feedback terminal, and a driving terminal for driving a switching element; and the device further includes a monitoring circuit configured to monitor a feedback signal of the feedback terminal; and a controlling circuit configured to determine whether the feedback signal of the feedback terminal is not a pulse signal and terminate an on/off operation of the switching element when the feedback signal of the feedback terminal is not a pulse signal.

In one embodiment, the monitoring circuit is configured to monitor the feedback signal of the feedback terminal in a period of a driving signal of the driving terminal.

In one embodiment, the device further includes a counting circuit configured to count the number of pulses or periods of the driving signal of the driving terminal, when the feedback signal of the feedback terminal is not a pulse signal.

In one embodiment, the controlling circuit is further configured to terminate the on/off operation of the switching element when the counted number is equal to or exceeds a preconfigured threshold.

In one embodiment, the controlling circuit further includes a comparing circuit configured to compare the feedback signal of the feedback terminal with a driving signal of the driving terminal; a determining circuit configured to determine whether the feedback signal of the feedback terminal is not consistent to the driving signal of the driving terminal; and an output circuit configured to output a controlling signal to terminate the on/off operation of the switching element when the feedback signal of the feedback terminal is not consistent to the driving signal of the driving terminal.

In one embodiment, the determining circuit is configured to determine the feedback signal of the feedback terminal is not consistent to the driving signal of the driving terminal, when a voltage waveform of the feedback terminal is not same as the voltage waveform of the driving terminal and/or the number of pulses or periods of the feedback signal of the feedback terminal is not same as the number of pulses or periods of the driving signal of the driving terminal in a same duration.

In one embodiment, the controlling circuit is further configured to determine that the feedback signal of the feedback terminal is a direct current signal when the feedback terminal is shorted with other terminals, or the feedback signal of the feedback terminal is zero when the feedback terminal is open.

In one embodiment, the counting circuit is further configured to count the number of the pulses or periods of the driving signal of the driving terminal, when the feedback signal of the feedback terminal is a direct current signal or zero.

In a second aspect, an integrated circuit is provided. The integrated circuit includes a device for controlling a power supply as illustrated in the first aspect.

In a third aspect, a method for controlling a power supply is provided. The method includes: monitoring a feedback signal of a feedback terminal; determining whether the feedback signal of the feedback terminal is not a pulse signal; and terminating an on/off operation of a switching element when the feedback signal of the feedback terminal is not a pulse signal.

In an embodiment, the method further includes: counting the number of pulses or periods of the driving signal of the driving terminal, when the feedback signal of the feedback terminal is not a pulse signal.

In an embodiment, the method further includes: comparing the feedback signal of the feedback terminal with a driving signal of a driving terminal; determining whether the feedback signal of the feedback terminal is not consistent to the driving signal of the driving terminal; and outputting a controlling signal to terminate the on/off operation of the switching element when the feedback signal of the feedback terminal is not consistent to the driving signal of the driving terminal.

According to various embodiments of the present disclosure, a feedback signal of the feedback terminal is monitored; and an on/off operation of a switching element is terminated when the feedback signal of the feedback terminal is not a pulse signal. Therefore, an abnormal status of the device can be correctly detected with a simple structure when the feedback terminal is open or is shorted with other terminals, while an error operation and a damage of the device can be avoided.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

The present disclosure will now be described with reference to several example embodiments. It should be understood that these embodiments are discussed only for the purpose of enabling those skilled persons in the art to better understand and thus implement the present disclosure, rather than suggesting any limitations on the scope of the present disclosure.

It should be understood that when an element is referred to as being "connected" or "coupled" or "contacted" to another element, it may be directly connected or coupled or contacted to the other element or intervening elements may be present. In contrast, when an element is referred to as being "directly connected" or "directly coupled" or "directly contacted" to another element, there are no intervening elements present. Other words used to describe the relationship between elements should be interpreted in a like fashion (e.g., "between" versus "directly between", "adjacent" versus "directly adjacent", etc.).

As used herein, the terms "first" and "second" refer to different elements. The singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof.

The term "based on" is to be read as "based at least in part on". The term "cover" is to be read as "at least in part cover". The term "one embodiment" and "an embodiment" are to be read as "at least one embodiment". The term "another embodiment" is to be read as "at least one other embodiment". Other definitions, explicit and implicit, may be included below.

In this disclosure, unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
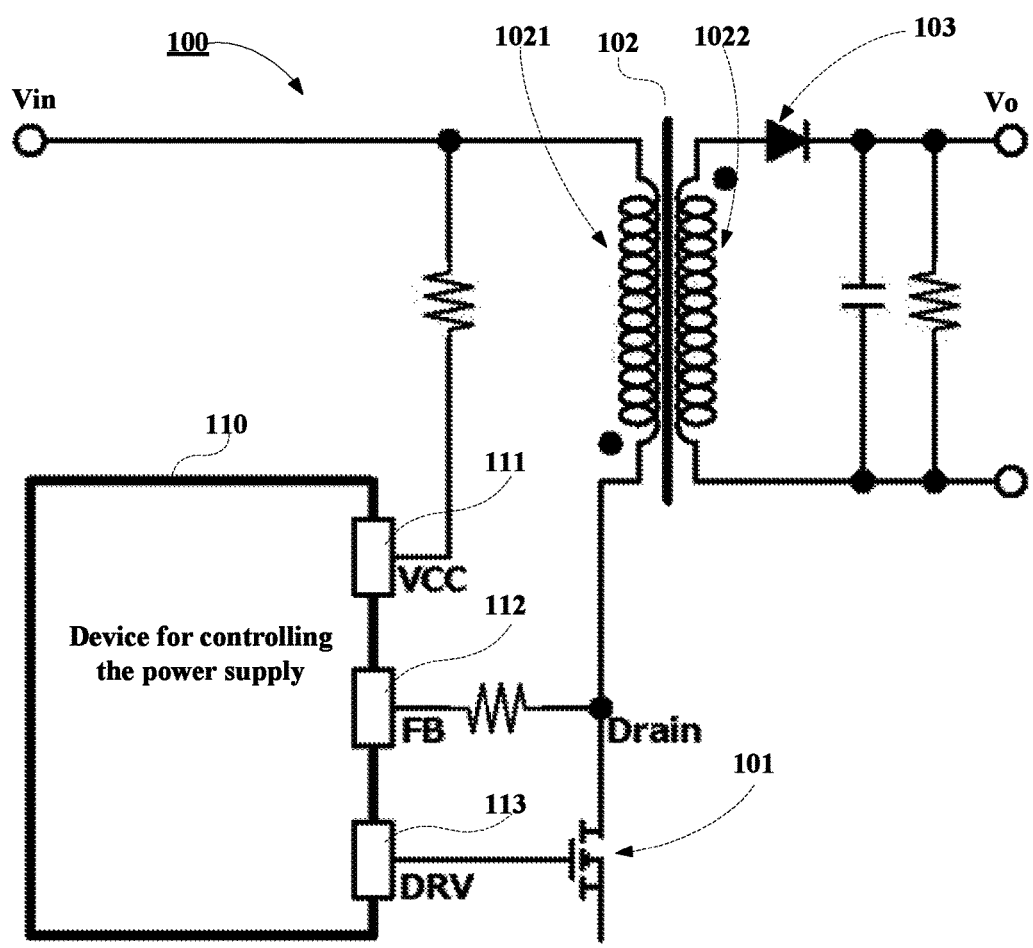
FIG. 1 is a diagram which shows a schematic illustration of a power supply and a device for controlling the power supply in the prior art.
Figure 2:
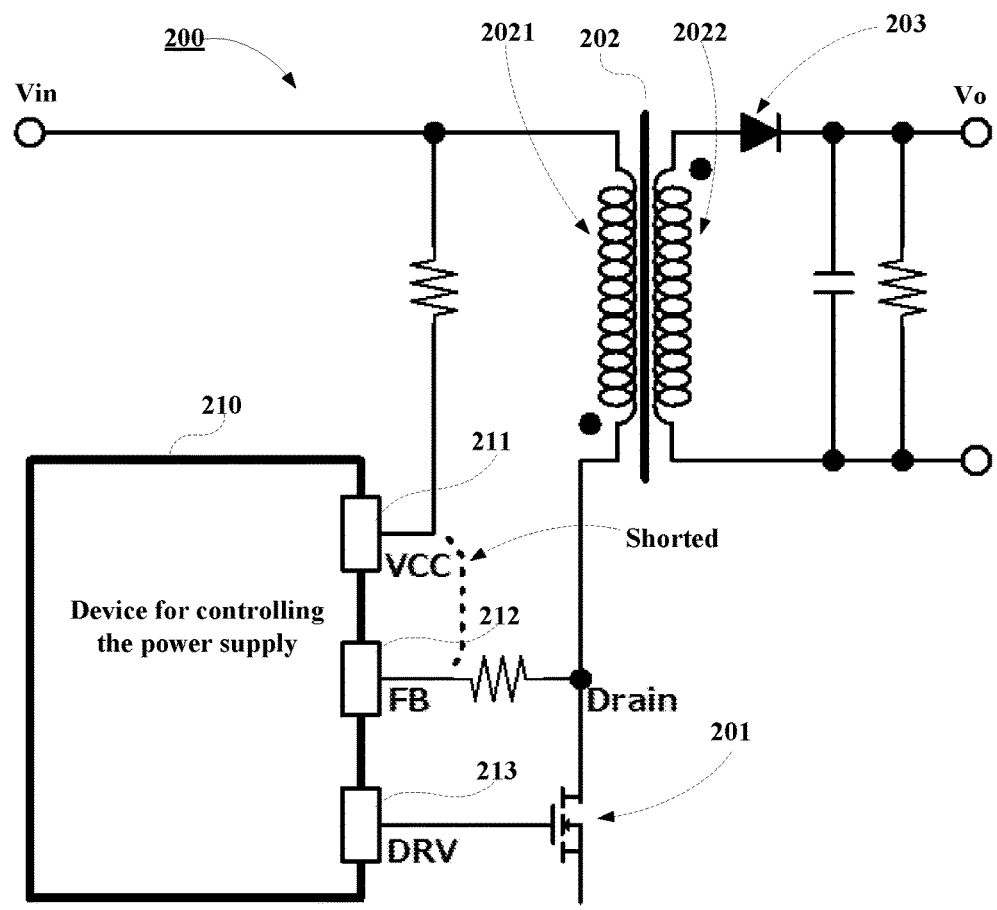
FIG. 2 is a diagram which shows a schematic illustration of a power supply and a device for controlling the power supply in accordance with an embodiment of the present disclosure.

FIG. 2 is a diagram which shows a schematic illustration of a power supply and a device for controlling the power supply in accordance with an embodiment of the present disclosure. As shown in FIG. 2, a power supply 200 is used to convert a first voltage (Vin, such as a direct current voltage or direct voltage) into a second voltage (Vo, such as a direct current voltage or direct voltage). The power supply 200 may include a switching element 201, a transformer 202 with a primary winding 2021 and a secondary winding 2022, a rectifying diode 203 connected to the secondary winding 2022.

As shown in FIG. 2, a device 210 for controlling the power supply 200 may include a source voltage terminal 211 (for example it is referred to as VCC), a feedback terminal 212 (for example it is referred to as FB), and a driving terminal 213 (for example it is referred to as DRV) for driving the switching element 201.

As shown in FIG. 2, the feedback terminal 212 may be shorted with the source voltage terminal 211. In this case, the feedback signal may be consistent to the source voltage and an error may be occurred in the driving signal. This may be a serious problem in an application required for highly reliability and stability.

Figure 3:
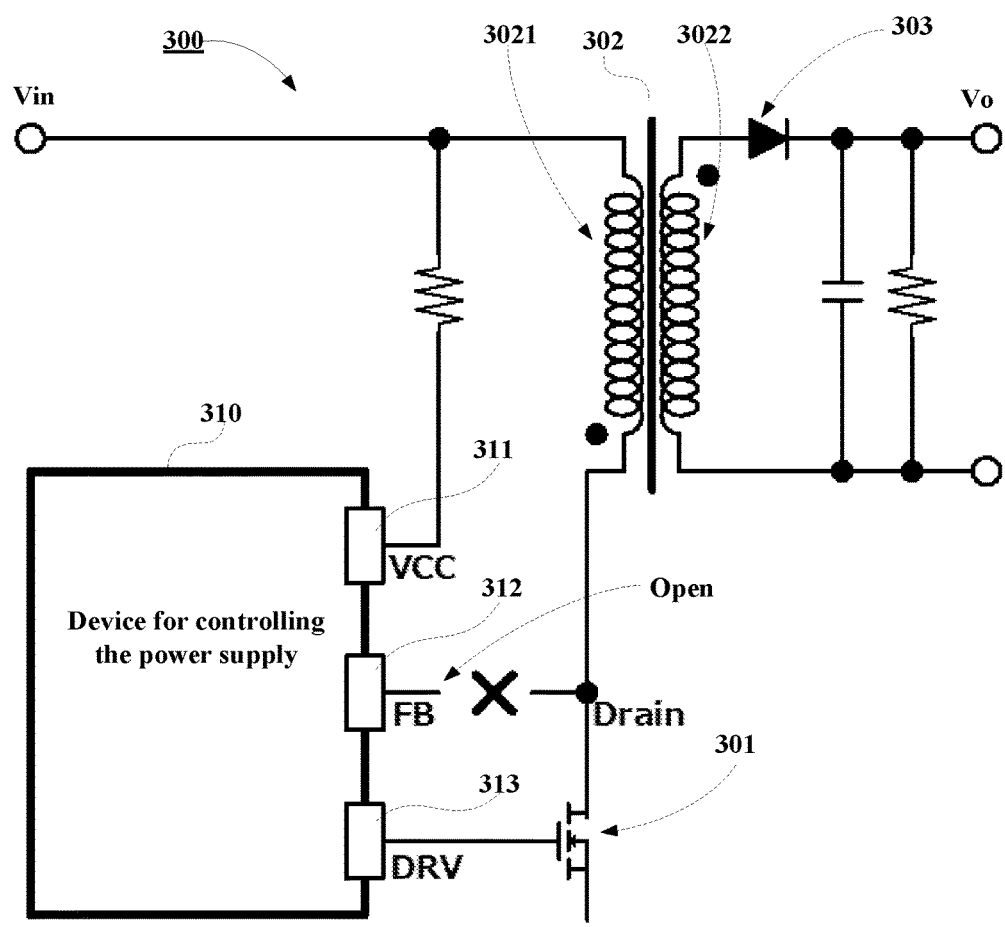
FIG. 3 is another diagram which shows a schematic illustration of a power supply and a device for controlling the power supply in accordance with an embodiment of the present disclosure.

FIG. 3 is another diagram which shows a schematic illustration of a power supply and a device for controlling the power supply in accordance with an embodiment of the present disclosure. As shown in FIG. 3, a power supply 300 is used to convert a first voltage (Vin, such as a direct current voltage or direct voltage) into a second voltage (Vo, such as a direct current voltage or direct voltage). The power supply 300 may include a switching element 301, a transformer 302 with a primary winding 3021 and a secondary winding 3022, a rectifying diode 303 connected to the secondary winding 3022.

As shown in FIG. 3, a device 310 for controlling the power supply 300 may include a source voltage terminal 311 (for example it is referred to as VCC), a feedback terminal 312 (for example it is referred to as FB), and a driving terminal 313 (for example it is referred to as DRV) for driving the switching element 301.

As shown in FIG. 3, the feedback terminal 312 may be open (or it is referred to as in an open status), for example, the feedback terminal 312 is disconnected to the drain electrode of the switching element 301. In this case, the feedback signal may be zero and an error may be occurred in the driving signal. This may be a serious problem in an application required for highly reliability and stability.

It should be appreciated that some components or elements are illustrated as examples in FIG. 2 and FIG. 3. However, it is not limited thereto, for example, connections or positions of the components or elements may be adjusted, and/or, some components or elements may be omitted. Moreover, some components or elements not shown in FIG. 2 and FIG. 3 may be added, while components or elements shown in FIG. 2 and FIG. 3 but not explained may be referred in the relevant art.

In this disclosure, the feedback signal may be generated by using primary side sensing. Furthermore, the structure of PSR or SSR may be combined with the primary side sensing to improve performance of the power supply, and the way of the feedback signal is not limited.

A First Aspect of Embodiments

A device for controlling a power supply is provided in the embodiments.

Figure 4:
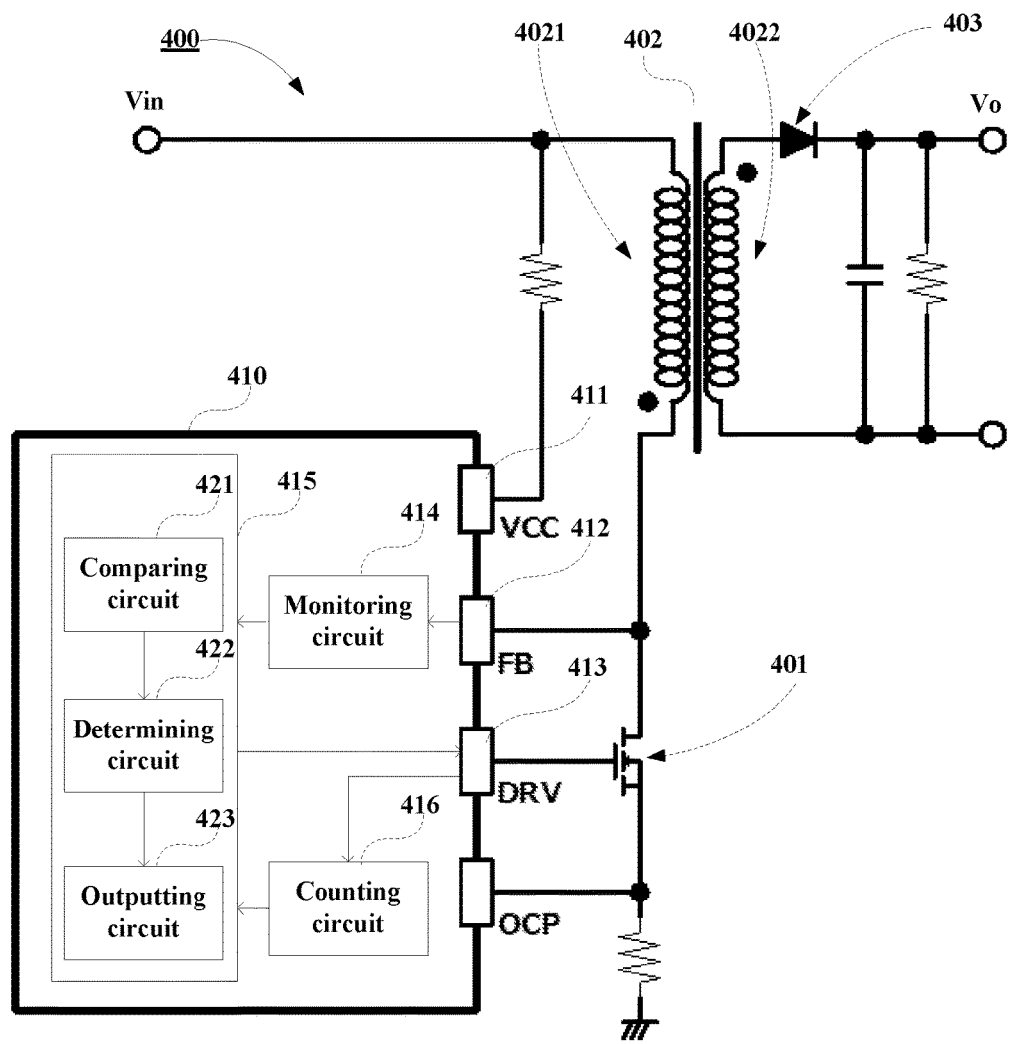
FIG. 4 is a diagram which shows a schematic illustration of a power supply 400 and a device 410 for controlling the power supply 400 in accordance with an embodiment of the present disclosure.

FIG. 4 is a diagram which shows a schematic illustration of a power supply 400 and a device 410 for controlling the power supply 400 in accordance with an embodiment of the present disclosure.

As shown in FIG. 4, the power supply 400 is used to convert a first voltage (Vin, such as a direct current voltage) into a second voltage (Vo, such as a direct current voltage). The power supply 400 may include a switching element 401, a transformer 402 with a primary winding 4021 and a secondary winding 4022, a rectifying diode 403 connected to the secondary winding 4022.

In an embodiment, the switching element 401 may be, for instance, a transistor such as an IGFET (Insulated Gate Field Effect Transistor), a MOSFET (Metal Oxide Semiconductor Field Effect Transistor) or an IGBT (Insulated Gate Bipolar Transistor), and so on. The rectifying diode 403 may be of any type of diode, for instance, it may be a Schottky diode. Numerous other types of rectifying diodes and/or switching elements may be used in addition and/or instead, and it is not limited in this disclosure.

As shown in FIG. 4, the device 410 may include a source voltage terminal 411, a feedback terminal 412, and a driving terminal 413 for driving the switching element 401. The device 410 may further include: a monitoring circuit 414 configured to monitor a signal (for example it may be referred to as feedback signal or FB signal) of the feedback terminal 412; and a controlling circuit 415 configured to determine whether the feedback signal of the feedback terminal 413 is not a pulse signal (for example a pulse voltage) and terminate (or stop, reset, reconfigure, and so on) an on/off operation of the switching element 401 when the feedback signal of the feedback terminal 412 is not a pulse signal.

In this disclosure, a feedback signal of the feedback terminal 412 is monitored; and the feedback signal of the feedback terminal 412 may be determined that it is not a pulse signal. For example, the feedback signal of the feedback terminal may be a direct current voltage, in this case, the feedback terminal 412 may be shorted with the source voltage terminal 411; alternatively, the feedback signal of the feedback terminal may be zero, in this case, the feedback terminal 412 may be open, for example, may be disconnected to the drain electrode of the switching element 401. However, the waveform of the feedback signal is not limited, for example, the feedback signal of the feedback terminal may be a triangular waveform or sawtooth waveform.

Therefore, an abnormal status of the device can be correctly detected with a simple structure when the feedback terminal is open or is shorted with other terminals, while an error operation and a damage of the device can be avoided.

In an embodiment, the monitoring circuit 414 may be configured to monitor the feedback signal of the feedback terminal 412 in a period (or it may be referred to as a cycle) of a driving signal of the driving terminal 413.

For example, the driving signal of the driving terminal 413 may be a pulse signal with a period T, for instance, a high level may be appeared every period T. The monitoring circuit 414 may be configured to monitor the feedback signal of the feedback terminal 412 one time in each period T.

In an embodiment, as shown in FIG. 4, the device 410 may further include a counting circuit 416 configured to count the number of pulses or periods of the driving signal of the driving terminal 413, when the feedback signal of the feedback terminal 412 is not a pulse signal.

The controlling circuit 415 may be further configured to terminate the on/off operation of the switching element 401 when the counted number is equal to or exceeds a preconfigured threshold (such as an integer number N).

For example, in a duration Ti (for example including five periods T), the feedback signal of the feedback terminal 412 is a direct current signal or zero, the number of pulses or periods of the feedback signal of the feedback terminal 412 may be counted, and the counted number is five.

Therefore, an abnormal status may be determined when the counted number is equal to or exceeds N, some noises can be ignored such that the abnormal status of the device can be detected more precisely.

As shown in FIG. 4, the controlling circuit 415 may include a comparing circuit 421 configured to compare the feedback signal of the feedback terminal 412 with a driving signal of the driving terminal 413; a determining circuit 422 configured to determine whether the feedback signal of the feedback terminal 412 is not consistent to the driving signal of the driving terminal 413; and an outputting circuit 423 configured to output a controlling signal to terminate the on/off operation of the switching element 401 when the feedback signal of the feedback terminal 412 is not consistent to the driving signal of the driving terminal 413.

In an embodiment, the determining circuit 422 may be configured to determine the feedback signal of the feedback terminal 412 is not consistent to the driving signal of the driving terminal 413, when a voltage waveform of the feedback terminal 412 is not same as the voltage waveform of the driving terminal 413, and/or, the number of pulses or periods of the feedback signal of the feedback terminal 412 is not same as the number of pulses or periods of the driving signal of the driving terminal 413 in a same duration.

For example, when a voltage waveform of the feedback terminal 412 is a direct current waveform while the voltage waveform of the driving terminal 413 is a pulse waveform, the determining circuit 422 may determine the feedback signal of the feedback terminal 412 is not consistent to the driving signal of the driving terminal 413.

For another example, in a duration Ti (for example including five periods T), when the number of pulses of the feedback signal of the feedback terminal 412 is 3 while the number of pulses of the driving signal of the driving terminal 413 is 5, the determining circuit 422 may determine the feedback signal of the feedback terminal 412 is not consistent to the driving signal of the driving terminal 413.

For another example, in a duration Ti (for example including five periods T), when a voltage waveform of the feedback terminal 412 (such as a triangle waveform) is not same as the voltage waveform of the driving terminal 413 (such as a rectangle waveform), but the number of pulses of the feedback signal of the feedback terminal 412 is same as the number of pulses of driving signal of the driving terminal 413, both of them are 5, the determining circuit 422 may determine the feedback signal of the feedback terminal 412 is consistent to the driving signal of the driving terminal 413.

It should be appreciated that some components or elements are illustrated as examples in FIG. 4. However, it is not limited thereto, for example, connections or positions of the components or elements may be adjusted, and/or, some components or elements may be omitted.

Moreover, some components or elements not shown in FIG. 4, for example, a modulation circuit configured to generate some pulses as the driving signal to perform pulse width modulation (PWM), may be added; while components or elements shown in FIG. 4 but not explained, for example, an over current protection (OCP) circuit in FIG. 4, may be referred in the relevant art.

In an embodiment, the controlling circuit 415 may be further configured to determine that the feedback signal of the feedback terminal is zero when the feedback terminal is open.

Figure 5:
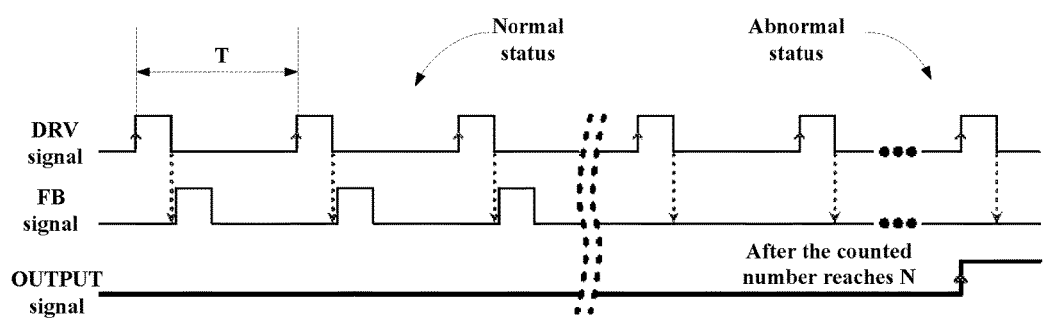
FIG. 5 is a diagram which shows the signals in one or more of elements in FIG. 4 in accordance with an embodiment of the present disclosure.

FIG. 5 is a diagram which shows the signals in one or more of elements in FIG. 4 in accordance with an embodiment of the present disclosure. As shown in FIG. 5, DRV signal denotes a voltage waveform of the driving terminal 413 while FB signal denotes a voltage waveform of the feedback terminal 412 and OUTPUT signal denotes an output signal from the controlling circuit 415.

As shown in FIG. 5, the monitoring circuit 414 may be configured to monitor the feedback signal of the feedback terminal 412 in each period T of the driving signal of the driving terminal 413. A normal status may be detected when the feedback signal of the feedback terminal 412 is consistent to the driving signal of the driving terminal 413.

As shown in FIG. 5, the counting circuit 416 is configured to count the number of pulses or periods of the driving signal of the driving terminal 413, when the feedback signal of the feedback terminal 412 is not a pulse signal, for example FB signal is zero in FIG. 5. An abnormal status may be detected and a controlling signal may be outputted from the controlling circuit 415 when the counted number reaches N.

In an embodiment, the controlling circuit 415 may be further configured to determine that the feedback signal of the feedback terminal 412 is a direct current signal when the feedback terminal 412 is shorted with other terminals.

Figure 6:
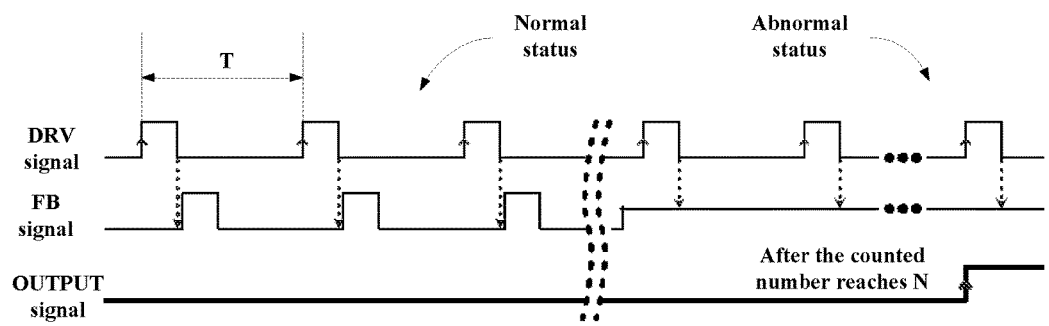
FIG. 6 is another diagram which shows the signals in one or more of elements in FIG. 4 in accordance with an embodiment of the present disclosure.

FIG. 6 is another diagram which shows the signals in one or more of elements in FIG. 4 in accordance with an embodiment of the present disclosure. As shown in FIG. 6, DRV signal denotes a voltage waveform of the driving terminal 413 while FB signal denotes a voltage waveform of the feedback terminal 412 and OUTPUT signal denotes an output signal from the controlling circuit 415.

As shown in FIG. 6, the monitoring circuit 414 may be configured to monitor the feedback signal of the feedback terminal 412 in each period T of the driving signal of the driving terminal 413. A normal status may be detected when the feedback signal of the feedback terminal 412 is consistent to the driving signal of the driving terminal 413.

As shown in FIG. 6, the counting circuit 416 is configured to count the number of pulses or periods of the driving signal of the driving terminal 413, when the feedback signal of the feedback terminal 412 is not a pulse signal, for example FB signal is a direct current signal in FIG. 6. An abnormal status may be detected and a controlling signal may be outputted from the controlling circuit 415 when the counted number reaches N.

It should be appreciated that some signals are illustrated as examples in FIG. 5 and FIG. 6. However, it is not limited thereto, for example, the feedback signal of the feedback terminal may be a triangular waveform or sawtooth waveform.

In an embodiment, an integrated circuit (IC) is provided, and the integrated circuit includes a device for controlling a power supply as illustrated in above.

It is to be understood that, the above examples or embodiments are discussed for illustration, rather than limitation. Those skilled in the art would appreciate that there may be many other embodiments or examples within the scope of the present disclosure.

As can be seen from the above embodiments, a feedback signal of the feedback terminal is monitored; and an on/off operation of a switching element is terminated when the feedback signal of the feedback terminal is not a pulse signal. Therefore, an abnormal status of the device can be correctly detected with a simple structure when the feedback terminal is open or is shorted with other terminals, while an error operation and a damage of the device can be avoided.

A Second Aspect of Embodiments

A method for controlling a power supply is provided in the embodiments. The corresponding device 410 and the power supply 400 are illustrated in the first aspect of embodiments, and the same contents as those in the first aspect of embodiments are omitted.

Figure 7:
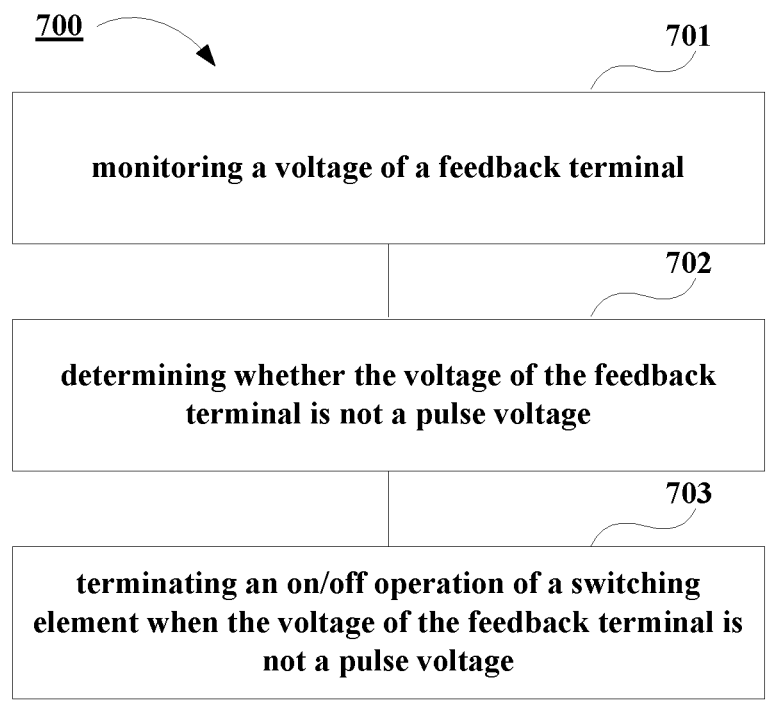
FIG. 7 is a diagram which shows a method for controlling a power supply in accordance with an embodiment of the present disclosure.

FIG. 7 is a diagram which shows a method for controlling a power supply in accordance with an embodiment of the present disclosure. As shown in FIG. 7, the method 700 includes:

Block 701, monitoring a feedback signal of a feedback terminal;

Block 702, determining whether the feedback signal of the feedback terminal is not a pulse signal; and Block 703, terminating an on/off operation of a switching element when the feedback signal of the feedback terminal is not a pulse signal.

In an embodiment, the feedback signal of the feedback terminal may be monitored in a period of a driving signal of a driving terminal.

Figure 8:
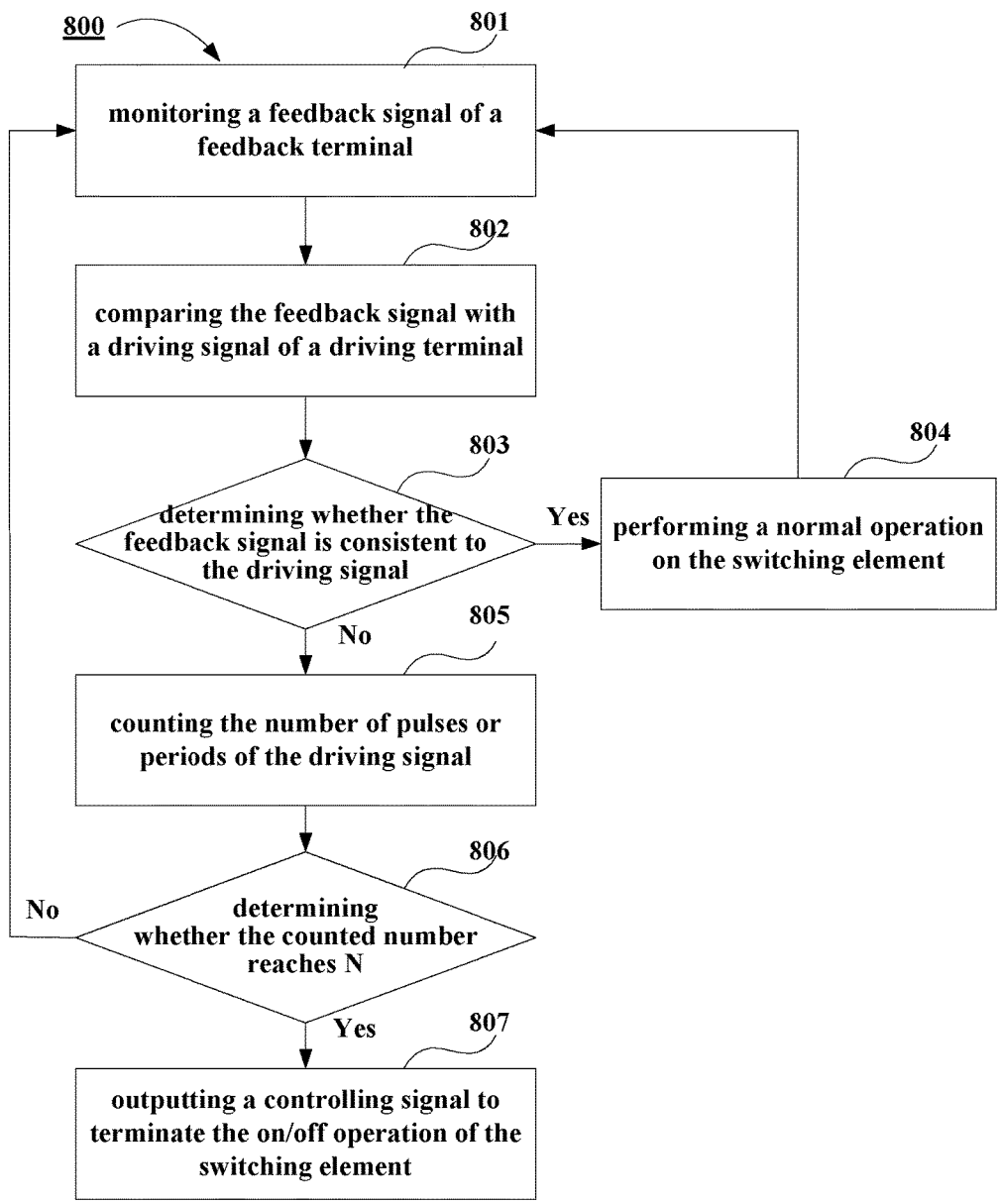
FIG. 8 is another diagram which shows a method for controlling a power supply in accordance with an embodiment of the present disclosure.

FIG. 8 is another diagram which shows a method for controlling a power supply in accordance with an embodiment of the present disclosure. As shown in FIG. 8, the method 800 includes:

Block 801, monitoring a feedback signal of a feedback terminal;

Block 802, comparing the feedback signal of the feedback terminal with a driving signal of a driving terminal;

Block 803, determining whether the feedback signal (FB signal) is consistent to the driving signal (DRV signal); entering into block 804 if yes, and entering into block 805 if no;

For example, the feedback signal is a direct current signal or zero while the driving signal is a pulse signal, it is determined that the feedback signal of the feedback terminal is not consistent to the driving signal of the driving terminal.

Block 804, performing a normal operation on the switching element;

Block 805, counting the number of pulses or periods of the driving signal of a driving terminal;

Block 806, determining whether the counted number reaches (is equal to or exceeds) a preconfigured threshold (such as N); entering into block 807 if yes.

Block 807, outputting a controlling signal to terminate the on/off operation of the switching element.

It should be appreciated that FIG. 8 is only an example of the disclosure, but it is not limited thereto. For example, the order of operations at blocks may be adjusted, and/or, some blocks or steps may be omitted. Moreover, some blocks or steps not shown in FIG. 8 may be added.

For another example, it may be determined that the feedback signal is consistent to the driving signal, when a voltage waveform of the feedback signal is same as (or is similar to) the voltage waveform of the driving signal.

For another example, it may be determined that the feedback signal is consistent to the driving signal, when the number of pulses or periods of the feedback signal is same as the number of pulses or periods of the driving signal in a same duration.

In an embodiment, it is determined that the feedback signal of the feedback terminal is a direct current signal when the feedback terminal is shorted with other terminals, or the feedback signal of the feedback terminal is zero when the feedback terminal is open.

In an embodiment, the number of the pulses or periods of the driving signal of the driving terminal is counted, when the feedback signal of the feedback terminal is a direct current signal or zero.

As can be seen from the above embodiments, a feedback signal of the feedback terminal is monitored; and an on/off operation of a switching element is terminated when the feedback signal of the feedback terminal is not a pulse voltage. Therefore, an abnormal status of the device can be correctly detected with a simple structure when the feedback terminal is open or is shorted with other terminals, while an error operation and a damage of the device can be avoided.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device.

While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous.

Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A device for controlling a power supply; the device comprising a source voltage terminal, a feedback terminal, and a driving terminal for driving a switching element;
   wherein the device further comprises:
   a monitoring circuit configured to monitor a feedback signal of the feedback terminal;
   a controlling circuit configured to determine whether the feedback signal of the feedback terminal is not a pulse signal and terminate an on/off operation of the switching element when the feedback signal of the feedback terminal is not a pulse signal; and
   a counting circuit configured to count the number of pulses or periods of the driving signal of the driving terminal, when the feedback signal of the feedback terminal is not a pulse signal.

2. The device according to claim 1, wherein the controlling circuit is further configured to terminate the on/off operation of the switching element when the counted number is equal to or exceeds a preconfigured threshold.

3. The device according to claim 1, wherein the counting circuit is further configured to count the number of the pulses or periods of the driving signal of the driving terminal, when the feedback signal of the feedback terminal is a direct current signal or zero.

4. The device according to claim 1, wherein the device for controlling a power supply is comprised in an integrated circuit.

5. A device for controlling a power supply; the device comprising a source voltage terminal, a feedback terminal, and a driving terminal for driving a switching element;
wherein the device further comprises:
a monitoring circuit configured to monitor a feedback signal of the feedback terminal; and
a controlling circuit configured to determine whether the feedback signal of the feedback terminal is not a pulse signal and terminate an on/off operation of the switching element when the feedback signal of the feedback terminal is not a pulse signal;
wherein the controlling circuit further comprises:
a comparing circuit configured to compare the feedback signal of the feedback terminal with a driving signal of the driving terminal;
a determining circuit configured to determine whether the feedback signal of the feedback terminal is not consistent to the driving signal of the driving terminal; and
an output circuit configured to output a controlling signal to terminate the on/off operation of the switching element when the feedback signal of the feedback terminal is not consistent to the driving signal of the driving terminal.

6. The device according to claim 5, wherein the determining circuit is configured to determine the feedback signal of the feedback terminal is not consistent to the driving signal of the driving terminal, when a voltage waveform of the feedback terminal is not same as the voltage waveform of the driving terminal and/or the number of pulses or periods of the feedback signal of the feedback terminal is not same as the number of pulses or periods of the driving signal of the driving terminal in a same duration.

7. The device according to claim 5, wherein the device for controlling a power supply is comprised in an integrated circuit.

8. A device for controlling a power supply; the device comprising a source voltage terminal, a feedback terminal, and a driving terminal for driving a switching element;
wherein the device further comprises:
a monitoring circuit configured to monitor a feedback signal of the feedback terminal; and
a controlling circuit configured to determine whether the feedback signal of the feedback terminal is not a pulse signal and terminate an on/off operation of the switching element when the feedback signal of the feedback terminal is not a pulse signal;
wherein the controlling circuit is further configured to determine that the feedback signal of the feedback terminal is a direct current signal when the feedback terminal is shorted with other terminals, or the feedback signal of the feedback terminal is zero when the feedback terminal is open.

9. The device according to claim 8, wherein the device for controlling a power supply is comprised in an integrated circuit.

10. A method for controlling a power supply, comprising:
monitoring a feedback signal of a feedback terminal;
determining whether the feedback signal of the feedback terminal is not a pulse signal; and
terminating an on/off operation of a switching element when the feedback signal of the feedback terminal is not a pulse signal; and
counting the number of pulses or periods of a driving signal of a driving terminal, when the feedback signal of the feedback terminal is not a pulse signal.

11. The method according to claim 10, wherein the on/off operation of the switching element is terminated when the counted number is equal to or exceeds a preconfigured threshold.

12. A method for controlling a power supply, comprising:
monitoring a feedback signal of a feedback terminal;
determining whether the feedback signal of the feedback terminal is not a pulse signal; and
terminating an on/off operation of a switching element when the feedback signal of the feedback terminal is not a pulse signal;
wherein the method further comprises:
comparing the feedback signal of the feedback terminal with a driving signal of a driving terminal;
determining whether the feedback signal of the feedback terminal is not consistent to the driving signal of the driving terminal; and
outputting a controlling signal to terminate the on/off operation of the switching element when the feedback signal of the feedback terminal is not consistent to the driving signal of the driving terminal.

13. The method according to claim 12, wherein it is determined that the feedback signal of the feedback terminal is not consistent to the driving signal of the driving terminal, when a voltage waveform of the feedback terminal is not same as the voltage waveform of the driving terminal and/or the number of pulses or periods of the feedback signal of the feedback terminal is not same as the number of pulses or periods of the driving signal of the driving terminal in a same duration.

14. The method according to claim 12, wherein the number of the pulses or periods of the driving signal of the driving terminal is counted, when the feedback signal of the feedback terminal is a direct current signal or zero.

15. A method for controlling a power supply, comprising:
monitoring a feedback signal of a feedback terminal;
determining whether the feedback signal of the feedback terminal is not a pulse signal; and
terminating an on/off operation of a switching element when the feedback signal of the feedback terminal is not a pulse signal;
wherein it is determined that the feedback signal of the feedback terminal is a direct current signal when the feedback terminal is shorted with other terminals, or the feedback signal of the feedback terminal is zero when the feedback terminal is open.

* * * * *